INVENTORS.
HOWARD WARNOCK and
WILLARD D. KAISER
BY
*Jeffers and Young*
ATTORNEYS INVENTORS.
HOWARD WARNOCK and
WILLARD D. KAISER
BY
Jeffers and Young
ATTORNEYS

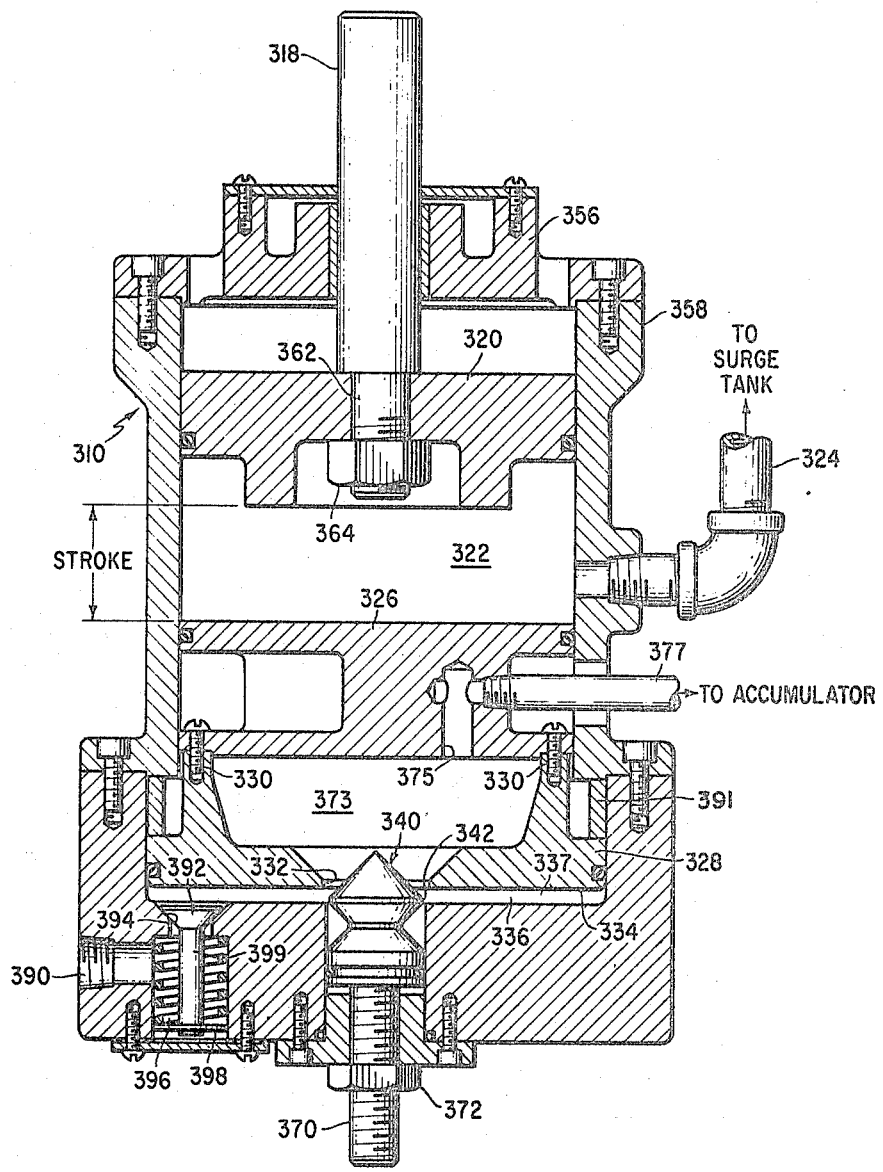

INVENTORS.
HOWARD WARNOCK and
WILLARD D. KAISER
BY
Jeffers and Young
ATTORNEYS

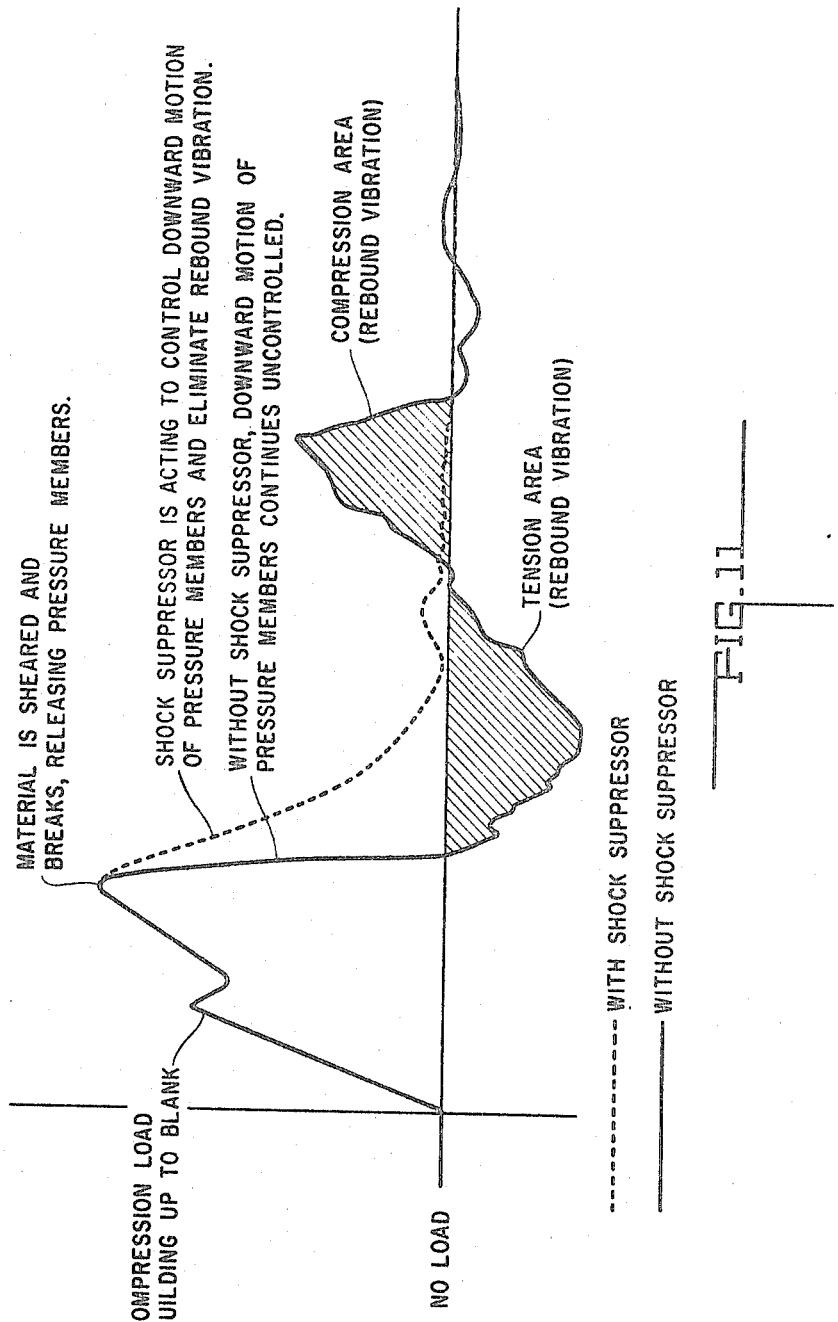

United States Patent Office 3,487,736
Patented Jan. 6, 1970

3,487,736
APPARATUS AND PROCESS FOR SUPPRESSING SHOCK IN A MECHANICAL PRESS OR THE LIKE
Willard D. Kaiser, Grove City, and Howard B. Warnock, Minster, Ohio, assignors to The Minster Machine Company, Minster, Ohio, a corporation of Ohio
Filed May 12, 1966, Ser. No. 549,640
Int. Cl. B26d 5/06
U.S. Cl. 83—13                                  9 Claims

ABSTRACT OF THE DISCLOSURE

A counterbalancing device is disclosed which includes a hydraulic cylinder having a movable piston provided with a metering pin to release fluid in a suitable housing which may be mounted in a press bed, uprights or crown. An actuation plate or rod is fastened to the press slide and serves to contact the hydraulic piston as the slide approaches the bottom of the stroke. The downward motion of the piston moves the metering pin into the orifice and decreases the outlet flow of the fluid. The pressure build-up in the fluid resists the force of the slide developed by its downward acceleration suppressing the occurrence of shock loads in press operations or the like.

This invention relates to an apparatus for suppressing the occurrence of shock loads in press operations or the like. Destructive vibration forces are set up within a press when there is a sudden release of resistance offered by the workpiece as it is broken through. During the blanking operation, the punch which is carried by the slide breaks suddenly through the work and at that point of breakthrough, the energy of the press operation is released in the form of rebounding vibrations which are objectionable because they tend to shake off accessories and covers from the press frame, develop extreme noise and transfer vibrations into the building. All of these factors are highly objectionable but are the normal and accepted failing of present day presses and other such apparatus. The larger the press, the heavier the work, the greater the shock loads which occur; and the constant repetition of such shocks has long been a source of problems in the metal-working art.

In view of these problems of the art, it is one of the primary objects of the present invention to provide an apparatus which can be conbined with a press, or other such appartus, at suitable locations on the apparatus and which will eliminate or at least substantially reduce the occurrence of the objectionable vibratory forces.

It is a further object of the present invention to provide an apparatus combinable with a press or the like which will not interfere with normal operation of the press but will offer, at the point of breakthrough of the workpiece, resistance to further operation of the press sufficient to suppress vibration. In spite of the rigidity of the press, the sudden shock load which is experienced at the instant the punch ruptures the material being blanked, there is an objectional occurrence of vibration which results from the downward acceleration of the slide at the breakthrough point. The present invention proposes a resistance force at the breakthrough point which will effectively overcome the occurrence of such shocks.

It is a further object of the present invention to provide a shock suppressing structure which can be adjusted to provide for different load, different materials being blanked and different size presses so that the resistance offered at the point of breakthrough can be adjusted to the instant that the punch ruptures the material being blanked. In this way, the objectionable vibratory forces are suppressed for a variety of different apparatus sizes and capacity.

It is another object of the present invention to provide a vibration suppressing device which can be disposed at several different locations on a press either as a single apparatus or in pairs and perform at any one of a number of different selected sites, the purpose of the invention which is to suppress vibrations. By selectively locating the device at any one of a number of different locations, it is possible to emphasize one or more of the features of rigid mounting, accessibility, disposal within readily available space in the bed, providing easy adjustment of the device, providing for minimal slide adjustment and other advantages as well.

It is an overall object of the present invention to provide a hydraulic piston and cylinder combination having a metering orifice and metering-orifice-regulating means which will at the proper stage of press closing provide a dissipation of energy in a manner which is nonharmful to the press and particularly so as compared with the previous method of dissipation of energy by press vibration. The recurrence of these vibrations in a high speed machine is highly objectionable.

Other objects and features of the present invention will become apparent from a consideration of the following description which proceeds with reference to the accompanying drawings, wherein:

FIGURE 5 illustrates the shock absorbing device of FIGURE 4 as it is installed in the bed of the press, the section line 4—4 indicating the section line on which FIGURE 4 is taken;

FIGURE 7 illustrates the cushioning device used in FIGURE 6;

FIGURE 11 illustrates the occurrence of vibrations during press operation.

Figure 1:
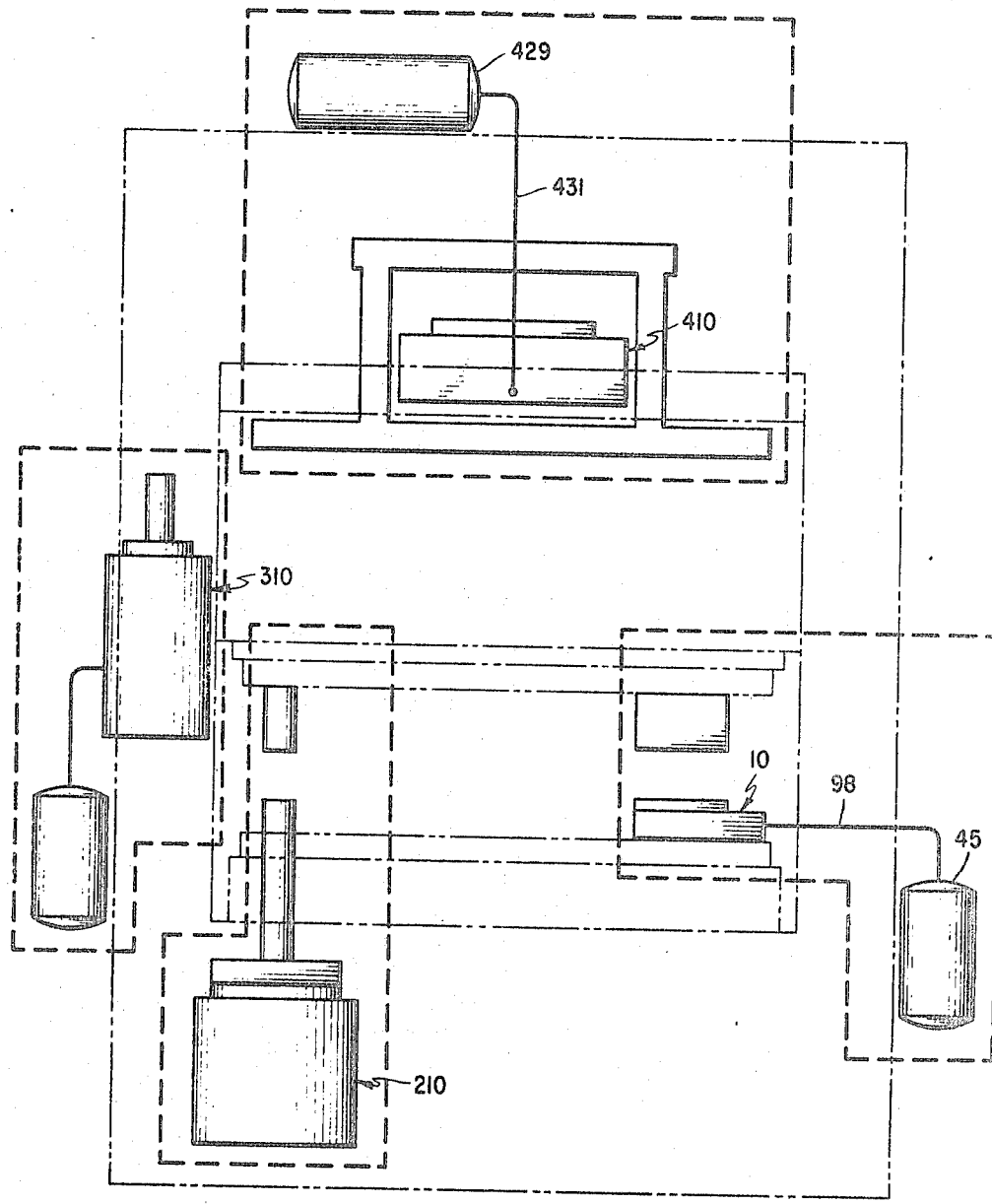
FIGURE 1 is an elevation view of a press having shock absorbing devices indicated at several different locations for the purpose of absorbing the shock and preventing vibration in the normal press operation.
Figure 3:
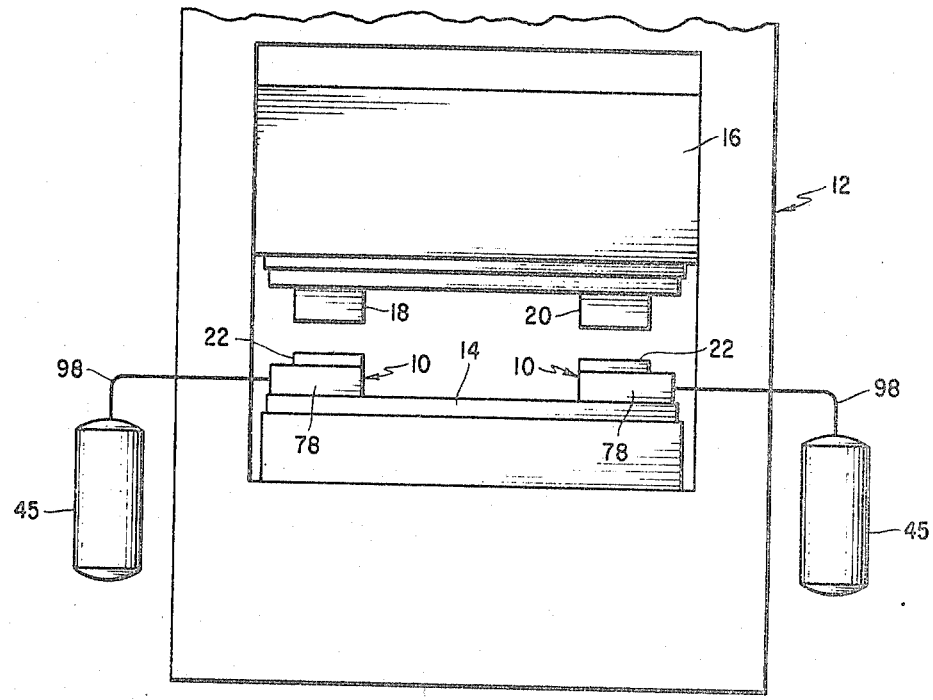
FIGURE 3 illustrates the hydraulic device of FIGURE 2 on the press.
Figure 2:
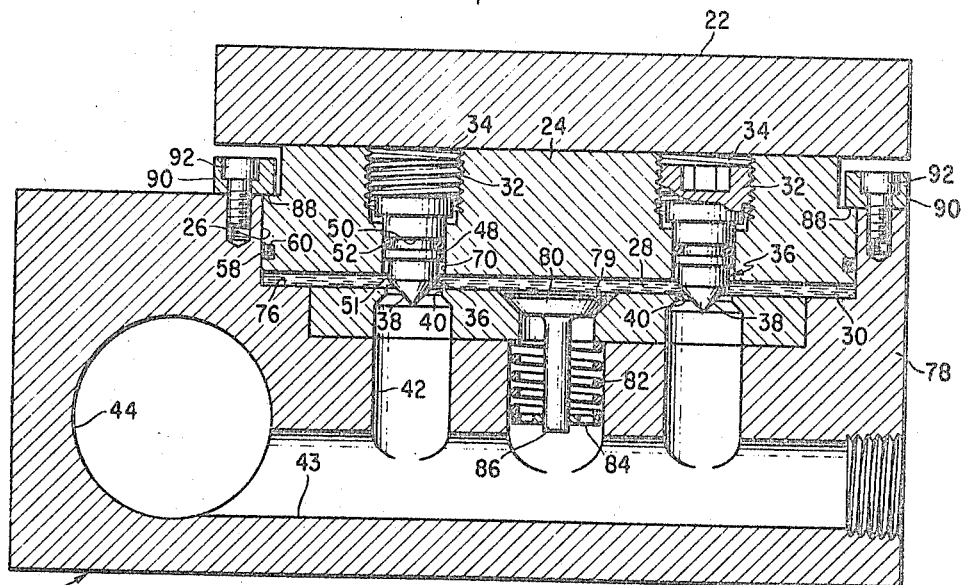
FIGURE 2 is a sectional view of a piston-cylinder and metering means which is mounted on the bolster on each side of the die set.

Referring now to the drawings, and particularly FIGURES 1, 2 and 3, the cushioning device, designated generally by reference numeral 10 is located in the press 12, being mounted on the bolster 14, there being a cushioning device 10 on each side of the die set.

Associated with the slide 16 are actuating rods 18 and 20 which come into engagement with strike plates 22 each having a piston 24 received within a cylinder 26 to form a variable volume chamber 28 having hydraulic fluid 30 therein. The piston 24 has one or more adjustable screws 32 within a threaded opening 34 which is adapted to position a metering pin 36 having a tapered nose 38 which moves in a metering orifice 40 through which fluid is exhausted from the variable volume chamber 28 into an exhaust passage 42 thence through a return line 43 to a return passage 44 leading to an accumulator 45 or the like. The metering pin 36 has a land 48 and groove 50 with an O-ring seal 52 therein so that as the piston 24 moves downwardly, the fluid 30 within the chamber 28 cannot move past the metering pin within opening 70; nor can the fluid move past the cylinder 26 because of O-ring 58 within groove 60 of piston 24.

The screw 32 is adjusted so that the end of the tapered nose 38 moves into restricting relation with the orifice 40 as the slide 16 moves downwardly and as the press tool reaches the breakthrough point on the workpiece, further downward movement of the slide 16 is resisted by the piston 24 which can be moved downwardly only by exhausting fluid from the chamber 28 through the metering orifice 40. However, the metering orifice 40 may be restricted by the enlarged diameter portion 51 being moved into a restricting relation within the orifice 40 at the point of breakthrough. It is not necessary to configure the metering pin 36 so that it varies in size or shape along its length; a constant diameter pin or constant size orifice is equally workable and is contemplated within the scope of the invention. In any event the hydraulic resistance is greatest at the occurrence of breakthrough.

Referring to FIGURE 11, which is a qualitative showing of the occurrence of vibration depending upon the position of the slide, it will be seen that vibrations are developed and reach a maximum at the breakthrough point because of the sudden release of energy the instant the punch ruptures the material being formed. The shock load which produces the vibration results from the sudden downward acceleration of the slide at breakthrough and the consequent sudden release of load from the bed.

In the present invention however the sudden acceleration of the slide is prevented because of a resistance to the downward movement of the piston 24 as the metering pin 36 moves into maximum orific-restricting relation with the orifice 40. The pressure buildup of fluid within the variable volume chamber 28 develops a sufficient resistance to downward movement of the piston 24, strike plate 22 and rods 18, 20 so that the slide 16 cannot develop sudden downward acceleration and for that reason the shock and vibrations are effectively suppressed. In other words, the pad of oil absorbs the kinetic energy of the slide when it is accelerated by the potential energy stored in the press structure The metering pin position can readily be adjusted by means of the screw 32 which permits positioning of the pin 36 by movement of the screw 32 threadedly within opening 34. In this way, the point at which the "pad" of oil suppresses the potential energy in the slide can be regulated in accordance with the size of the workpiece, the size of the press, and other considerations as well. When the slide 16 reaches its lowermost position, the piston 24 closely approaches but does not bottom on surface 76 of members 78. At this point, the kinetic energy of the slide has been for the most part dissipated by movement of the hydraulic fluid 30 from chamber 28 past the metering orifice 40.

When the slide 16 rises, and piston 24 likewise rises the chamber 28 increases in volume and fluid fills the expanding chamber 28 through a supply port 79 controlled by a valve 80 which is loaded by a spring 82 acting through an apertured member 84 and stem 86 to hold the valve 80 in a normally closed position. However, when the piston 24 rises, the fluid from lines 44 and 43 can unseat the valve 80 and fill the expanding chamber 28 so that a vacuum will not occur; otherwise air might be sucked into the chamber 28. Upward travel of the piston is limited by an annular shoulder 88 engaging a ring 90 secured by spaced bolts 92 to the member 78.

Hydraulic fluid is supplied to a chamber 28 and is received from chamber 28 by a reservoir or accumulator 45 (FIG. 3) having a line connection 98 with passage 44 (FIG. 2).

In operation, the repetitive action of the slide during normal press operation, is not accompanied by objectionable vibratory forces to the extent that previously occurred, such vibratory forces being objectionable because of the noise; the damage to the building foundation; shaking down of press accessories, etc.

Such vibratory forces are effectively suppressed because each time that the slide 16 reaches its breakthrough position, instead of suddenly accelerating and imposing vibration-producing forces on the bed of the press, there is a pressure buildup in the chamber 28 which resists downward movement of the slide in preventing the occurrence of slide acceleration and this resistance from the fluid is produced because of the metering pin 36 entering the orifice 40 and producing a maximum restriction at the point of breakthrough. The "pad" of oil prevents sudden acceleration of the slide. As soon as the downward forces on the slide are relieved and its movement is reversed; the chamber 28 becomes an expanding chamber; the fill valve 80 opens and fluid is supplied from the reservoir 45 through lines 98, 44 and 43 and past the fill valve 80 to occupy the expanding chamber 28 and prevent air from being sucked into the system.

Figure 5:
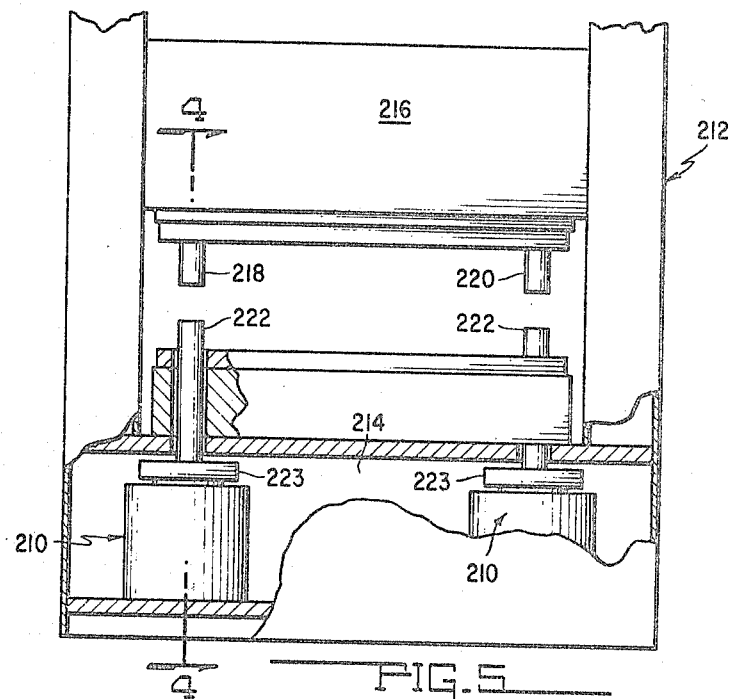
Figure 4:
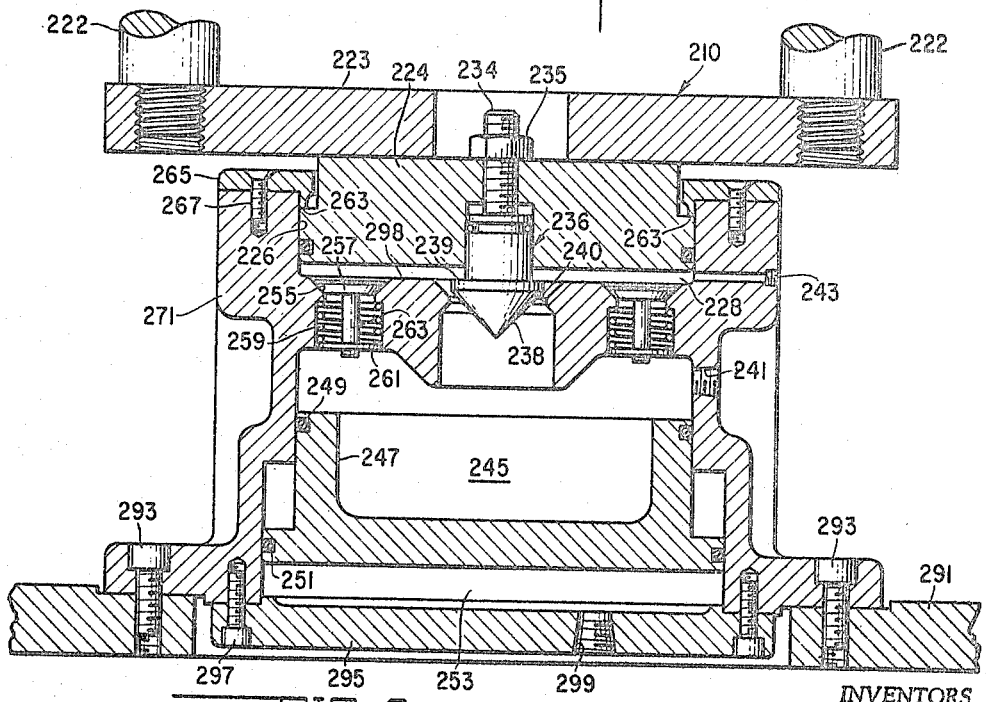
FIGURE 4 illustrates a further embodiment of the invention utilizing a piston-cylinder, metering pin and air cushion which is mounted in the bed of the press, there being generally two such devices.

Referring next to the embodiment of FIGS. 4 and 5, the cushion device 210 is shown mounted in bed 214 of press 212. The slide 216, as it descends, has rods 218, 220 which engage pins 222 forcing the plate 223 downwardly together with the piston 224 slidably received within a cylinder bore 226. The fluid chamber 228 exhausts fluid as the piston 224 is forced downwardly, such fluid being metered through an orifice 240, the effective area of which is regulated by a metering pin 236 having a tapered nose 238 which extends through orifice 240 and regulates its effective metering area. The metering pin 236 is positioned, and configured, so that its larger diameter end 239 is moved into maximum orifice-restricting position by the piston 224 at the break-through point on the workpiece. Thus, the "pad" of oil within chamber 228 offers maximum resistance to further downward movement of the piston 224, plate 223 and pins 222 and consequently the slide 216 at the break-through point, thus preventing acceleration of the slide 216 and the consequent development of excessive vibrations in the press.

The position of the metering pin 236 is regulated by means of a threaded stem 234 having an associated nut 235 which permits adjustment of the position of metering pin 236. The hydraulic fluid is supplied to chamber 228 through a charging port 241 and bleeding of the system takes place through a bleedport 243. The chamber 245 into which the hydraulic fluid is passed contains a movable wall 247 having spaced O-ring seals 249, 251 and the movable wall is backed by a closed chamber 253 having air therein which serves as an air spring for return of the oil within chamber 245 when the slide 216 is raised. Thus when the downward movement of the press is reversed and starts to rise, the compressed air within chamber 253 raises movable wall 247 moving the hydraulic fluid from chamber 245 past the charging port 255 which are normally maintained closed by fill valves 257 which are biased to closed position by associated springs 259 which act against a shoulder 261 and stem 263 to urge the fill valves 257 to a normally closed position. As the slide 216 is raised the air spring 253 will force fluid from chamber 245 past the port 255 by lifting the valves 257 and forcing such fluid into expanding chamber 228, thus raising both the piston 224 and metering pin 236 until the piston 224 is brought into engagement with the shoulder 263 of ring 265 secured by screws 267 to the cylinder body 271.

The cylinder body 271 is mounted in the bed 214 of the press by bolts, or the like, 293 and the air spring chamber 253 is maintained sealed by a fixed end wall 295 held in place by bolts 297 and containing a suitable charging port 299.

In operation, as the slide 216 moves downwardly to cause its associated punch to bear against the workpiece and precisely at the break-through point, the slide has caused the metering pin 236 to move into a position such that the portion 239 (FIG. 4) is moved into a maximum orifice-restricting position with respect to the orifice 240. Thus the resistance offered by the fluid within chamber 228 to further downward movement of the piston 224 and hence the plate 223, rods 222, rods 218 and slide 216, is sufficient to prevent the sudden occurrence of acceleration at the break-through point, and therefore suppresses the occurrence of vibration which would otherwise occur owing to such sudden slide acceleration at break-through. The momentary hydraulic resistance is of sufficient duration so that the kinetic energy of the slide is dissipated by the remaining stroke portion required to exhaust the fluid from chamber 228 and before the piston 224 bottoms on partition 298. The exhausting fluid forces the movable wall 247 downwardly as it enters chamber 245 and thus compresses the air within closed chamber 253, the compressed air serving as an air spring to return the fluid to chamber 228 when the press slide 216 is raised.

The compressed air within chamber 253, when the slide 216 is raised, forces wall 247 upwardly, thus exhausting fluid from chamber 245 through fill ports 255 by lifting the fill valves 257 against the resistance of springs 259 and causing the fluid to fill the increasing volume chamber 228 and preventing the occurrence of vacuum which might suck air into the chamber 228.

Figure 6:
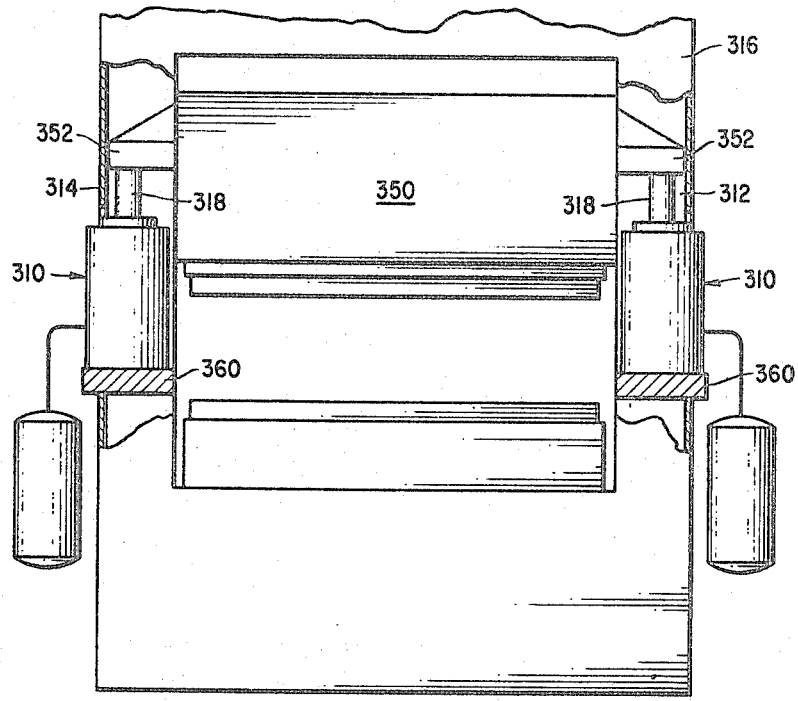
FIGURE 6 illustrates two devices mounted in uprights as a part of the slide counterbalance cylinders.

Referring next to the embodiment of FIGS. 6 and 7, the shock absorbing device 310 is mounted in the uprights 312 and 314 of press 316. In this embodiment the plunger 318 has a movable wall 320 adjustably secured thereto, acting against a chamber 322 which is filled with air, providing an air spring. The air chamber 322 is connected to a surge tank through conduit 324. A second movable wall 326 of the chamber 322 is secured to a piston 328 in some suitable manner as by screws 330, or the like. The piston 328 has a metering orifice 332 and a working face 334 which acts against a "pad" of hydraulic fluid 336 when the piston 328 is forced downwardly and fluid is exhausted from chamber 337 by metering of fluid through orifice 332, the effective size of said orifice being regulated by a metering pin 340 having a tapered nose and an enlarged portion 342 which moves into maximum restricting position with respect to the orifice 332 when the piston 328 has been moved downwardly by an amount corresponding to the breakthrough position of the slide 350.

In operation, as the slide 350 descends, a portion thereof 352 engages plunger 318 which is moved past the fixed end wall 356 secured to cylinder casing 358 mounted on upright 360. As the plunger 318 moves downwardly it moves with its movable wall 320 through the threaded adjuster stem 362 and nut 364, thereby compressing the air within chamber 322 through a portion of its stroke indicated by the arrows in FIG. 7. The compressed air is connected to a surge tank through 324. The best mode of operation is to make the piston 328 on the damper side of the unit larger than the piston 326 on the air side of the damper and to pressurize the accumulator that supplies oil to the damper at the oil inlet 390, with air at the same pressure as the air in the surge tank. FIGURE 7 illustrates an appropriate relative piston diameter size. In operation, the movable wall 320 moves down compressing the air in the chamber 322. Since the pressure in the damper cavity 337 is the same as the pressure in 322 because of a common connection between conduit 324 and inlet 390 through an accumulator, there is no tendency to move the pistons in either direction. Piston 328, being larger than piston 326 generates an upward force which is constrained from moving upwardly beyond the point defined by contact with ring 391. Until the piston 320 makes physical contact with the upper damper piston 326, the unit works only as a counterbalance cylinder. However, when the piston 320 contacts the upper damper piston 326 the damper section moves and the damping action occurs as described in the previous embodiments. As the piston 328 moves downwardly the effective area of the metering orifice 332 is regulated by the metering pin 340 and the metering pin 340 is configured and adjustably positioned by the threaded stem 370 having a locked nut 372 so that the large portion 342 of the metering pin has moved within the orifice 332 to produce a maximum restriction at the time that the plunger 318, movable with wall 326 and piston 328 is moved downwardly by an amount corresponding to the breakthrough position of the slide. The slide is thus offered maximum resistance to downward acceleration at the breakthrough point by the "pad" of oil 336 within chamber 337 and consequently acceleration of the slide and resulting vibrations are effectively obviated. The fluid which is exhausted from chamber 337 and moves into chamber 373 is next moved through passage 375 and 377 to an accumulator (not shown). On the other hand, when piston 328 is raised and chamber 337 is expanded, fluid is again charged to the chamber through an inlet port 390 past fill valve 392 which is normally closed against seat 394 and is maintained in that position by the biasing action of spring 396 which bears against a washer 398 carried by valve stem 399.

The plunger 318 (FIG. 6) is raised by the air spring action of the compressed air within chamber 322 whence the downward force on the slide is relieved.

The shock absorbing device 310 can be adjusted in its position to compensate for different positions upwardly from the bottom of the press stroke at which work is being done. In other words, the shock absorbing device operation 310 can be initiated and can terminate whatever position is dictated by the closing position of the press at the time that it achieves breakthrough on the work.

Figure 8:
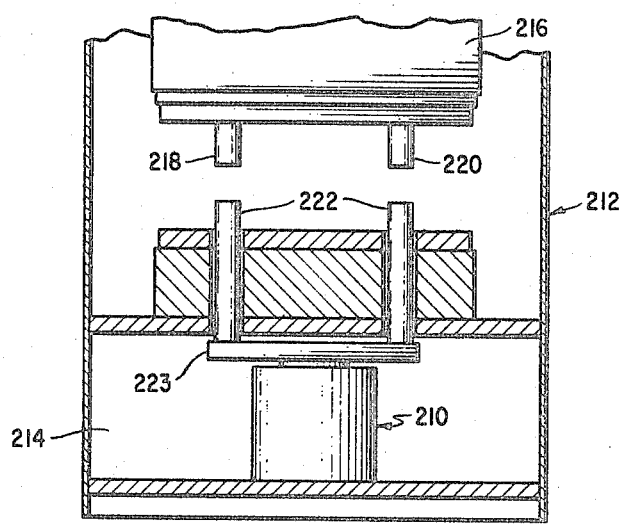
FIGURE 8 illustrates the arrangement of FIGURE 5 in which a single device is usable in the bed of the press instead of a pair of such devices.

Referring next to the embodiment shown in FIG. 8, it will be noted that a single device mounted in the bed of the press can be mounted in place of two devices as shown in FIG. 5. In all other respects the device operates the same as the combination of devices illustrated in FIGS. 4 and 5.

Figure 10:
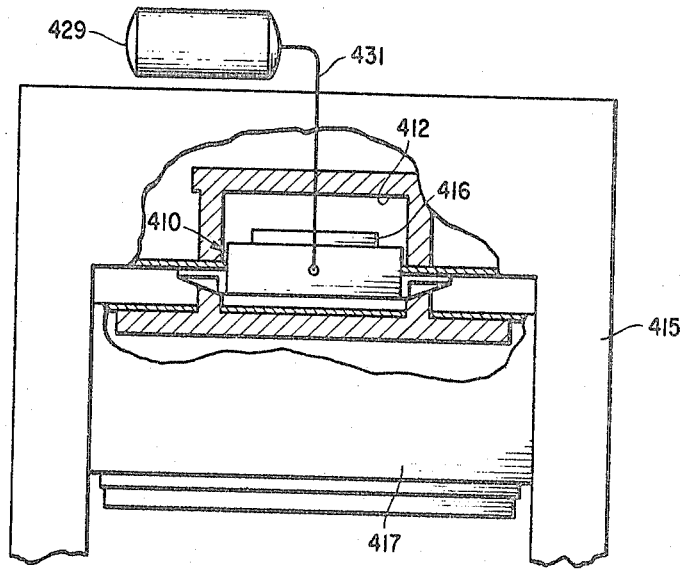
FIGURE 10 illustrates the location of the device of FIGURE 9 on the crown of the press.
Figure 9:
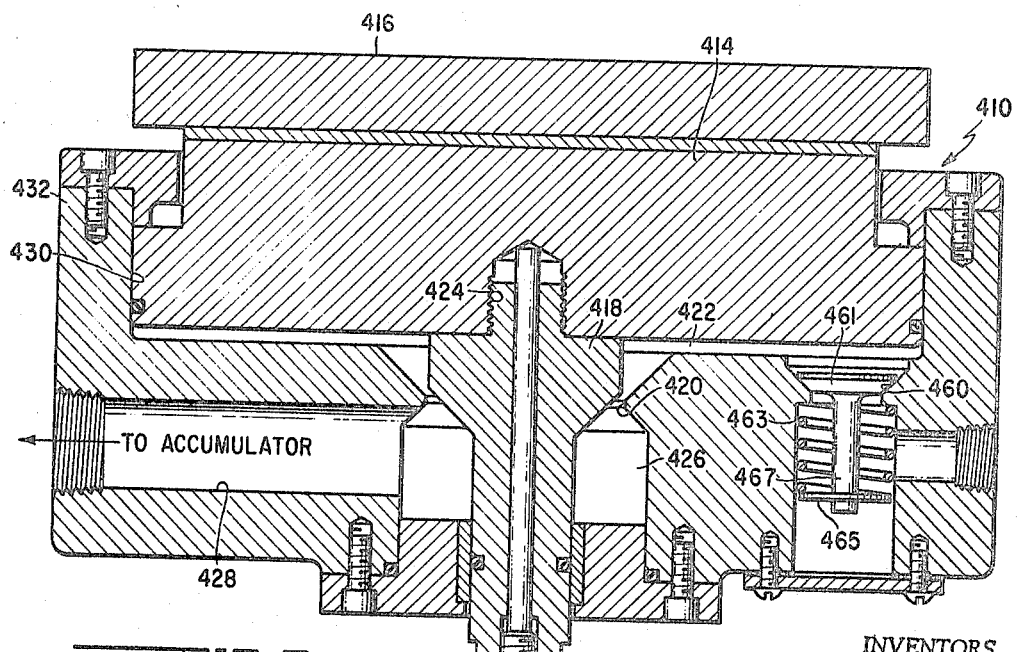
FIGURE 9 illustrates a further embodiment of the invention in which the cushioning device is mounted in the bottom of the crown on the press centerline.

Referring next to the embodiment shown in FIGS. 9 and 10, the dampening device 410 is mounted within the crown 412 of press 415 as indicated in FIG. 10. The device includes a piston 414 which is movable by a strike plate 416, said piston 414 having secured thereto a metering pin 418 which is movable through a metering orifice 420 to determine the resistance to exhausting of fluid from chamber 422. The configuration and adjusted position for the metering pin 418 which can be threadedly moved into and out of the threaded opening 424 determines the point at which maximum resistance is offered to such metering of fluid. It is so arranged that the metering pin moves into maximum orifice restricting position at the breakthrough point of the press in the same manner as previously described. After the fluid has passed from the chamber 422 it enters passages 426 and 428 and then to an accumulator 429.

The piston 414 is slidably received within a cylinder bore 430 which is part of a cylinder housing 432. The chamber 422 is replenished with fluid during raising of the slide by fluid being supplied from the accumulator 429 through line 431 and fill port 460, the fill valve 461 being raised against the resistance of spring 463 which acts against the washer 465 attached to the valve stem 467. Such filling occurs when the slide 417 raises (FIG. 10) and the surface of the crown 412 which engages the strike plate 416 when the slide 417 descends.

The advantage of the arrangement shown in FIGS. 9 and 10 is that only a single device is required for effecting damping and therefore suppression of the vibrations.

Although the present invention has been illustrated and described in connection with a few selected example embodiments, it will be understood that this is illustrative of the invention and is by no means restrictive thereof. It is reasonable to be expected that those skilled in this art can make numerous revisions and adaptations of the invention and it is intended that such revisions and adaptations will be included within the scope of the following claims as equivalents of the invention.

What is claimed is:

1. In a press having a bolster, a frame and a movable slide, a counterbalancing device for resisting slide movement at a distance above its lowermost stroke and adapted for operation at the snap through point, actuator means operatively carried by said slide for movement therewith, a member including cylinder means carried by the bolster, a movable piston having metering means carried thereby, said piston means being reciprocable in said cylinder means, means for supplying hydraulic fluid under pressure to said cylinder means, and said metering means operable in response to movement of said piston means in said cylinder means for restricting discharge of fluid from said cylinder means during the last portion of the stroke of the slide to resist movement of the piston means into the cylinder means.

2. In combination with a punch and die set, a counterbalancing device for resisting slide movement at a distance above its lowermost stroke and adapted for operation at the snap through point, cylinder means including a movable piston, metering means carried by the movable piston, said cylinder means including an orifice cooperating with said metering means, means for supplying hydraulic fluid under pressure to said cylinder means, means for moving the movable piston simultaneously with the operation of said punch and die set to displace fluid from the cylinder means, and said metering means operable to decrease the orifice opening for restricting the discharge of fluid from said piston means at substantially the moment that the load is relieved from the punch and die set by the punch breaking through a workpiece being operated therein.

3. The apparatus in accordance with claim 2, including means for adjusting the position of said metering means whereby its restricting relation with respect to the orifice will produce resistance to the closing movement of the punch and die set at a predetermined breakthrough position wherein load is suddenly relieved on the punch.

4. The apparatus in accordance with claim 1 wherein said cylinder is disposed within the press bed and said rod extends through the bolster thereof for operation of said apparatus.

5. The apparatus in accordance with claim 2 wherein said apparatus is disposed in the upright of the press as a portion of the slide counterbalance cylinders thereof.

6. The apparatus in accordance with claim 2 wherein said apparatus is disposed within the crown of the press.

7. The apparatus in accordance with claim 1 wherein said apparatus is disposed within the bolster of the press and including an actuator plate mounted on said slide for effecting operation of the vibration suppressing apparatus.

8. The method of suppressing vibrations in a press structure having a punch and die set mounted therein, said shocks being occasioned by the punch breaking through a workpiece being operated comprising: interposing a cylinder unit with a movable piston between the slide and bed of the press so that fluid under pressure is expelled therefrom as the punch is moved toward the die for a work operation, and momentarily restricting the discharge of fluid by a metering means carried by the movable piston during the last portion of the stroke where the punch is breaking through a workpiece being operated and returning the fluid under pressure to the cylinder unit.

9. The apparatus in accordance with claim 2 wherein the cylinder means includes at least one charging port having a one-way valve disposed therein.

References Cited

UNITED STATES PATENTS

| | | | |
|---|---|---|---|
| 2,278,713 | 4/1942 | Riddle | 83—639 X |
| 3,205,749 | 9/1965 | Schenk | _83—639 |
| 2,069,791 | 2/1937 | Wallace | 188—88 X |
| 2,981,136 | 4/1961 | Legge | 83—632 |

FOREIGN PATENTS 1,033,051    6/1958    Germany.

ANDREW R. JUHASZ, Primary Examiner

U.S. Cl. X.R.

83—55, 617, 639